United States Patent
Lefever

(10) Patent No.: US 10,620,507 B2
(45) Date of Patent: *Apr. 14, 2020

(54) REMOTE CONTROLLED ROTATING CAMERA MOUNT

(71) Applicant: William Conn Lefever, Bishop, CA (US)

(72) Inventor: William Conn Lefever, Bishop, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,537

(22) Filed: May 21, 2018

(65) Prior Publication Data

US 2018/0267391 A1   Sep. 20, 2018

Related U.S. Application Data

(63) Continuation-in-part of application No. 15/398,646, filed on Jan. 4, 2017, now Pat. No. 9,977,312.

(Continued)

(51) Int. Cl.
  *G03B 17/56* (2006.01)
  *F16M 11/12* (2006.01)
  *H04N 5/232* (2006.01)
  *F16M 13/02* (2006.01)
  *F16M 11/04* (2006.01)
  (Continued)

(52) U.S. Cl.
  CPC ......... *G03B 17/561* (2013.01); *F16M 11/046* (2013.01); *F16M 11/08* (2013.01); *F16M 11/12* (2013.01); *F16M 11/18* (2013.01); *F16M 13/02* (2013.01); *F16M 13/022* (2013.01); *H04N 5/2251* (2013.01); *H04N 5/2252* (2013.01);
  (Continued)

(58) Field of Classification Search
  CPC .. G03B 17/561; H04N 5/2252; H04N 5/2251; H04N 5/23203; F16M 11/18; F16M 11/046; F16M 13/022; F16M 11/12
  See application file for complete search history.

(56) References Cited

U.S. PATENT DOCUMENTS 5,463,432 A   10/1995   Kahn
5,555,019 A   9/1996   Dole
(Continued)

OTHER PUBLICATIONS https://en.wikipedia.org/wiki/Inductive_charging.
https://en.wikipedia.org/wiki/Electromagnetic_induction.
https://en.wikipedia.org/wiki/Resonant_inductive_coupling.

*Primary Examiner* — Lin Ye
*Assistant Examiner* — Tuan H Le

(57) ABSTRACT

The invention comprises a small, easily transportable, specially programmed, wirelessly controlled camera mounting device. The camera mounting device is equipped with a ¼-20 stud, the standard type of stud used by tripods, so the user can easily mount a Go-Pro camera or any other kind of presently available small camera on the camera mounting device. Embodiments of the device can rotate the camera up to 360 degrees, left or right, at any of multiple speeds, and can pause, and rotate the camera up or down. Embodiments of the device can attach themselves to other surfaces, by several methods, and can be charged wirelessly. The invention also includes a method that eliminates the need to use multiple cameras, while making a video, and splice the video together after the fact. This invention also comprises security systems using the camera mount.

20 Claims, 9 Drawing Sheets

Related U.S. Application Data

(60) Provisional application No. 62/299,934, filed on Feb. 25, 2016.

(51) Int. Cl.
  *F16M 11/18* (2006.01)
  *H04N 5/225* (2006.01)
  *F16M 11/08* (2006.01)

(52) U.S. Cl.
  CPC ......... *H04N 5/232* (2013.01); *H04N 5/23203* (2013.01)

(56) References Cited

U.S. PATENT DOCUMENTS

| | | | |
|---|---|---|---|
| 7,667,769 B2 | 2/2010 | Gao et al. | |
| 9,977,312 B1* | 5/2018 | Lefever | H04N 5/2251 |
| 10,072,947 B1* | 9/2018 | Mantler | G01D 5/22 |
| 2002/0172518 A1 | 11/2002 | Watson | |
| 2003/0234512 A1* | 12/2003 | Holub | B60D 1/36 |
| | | | 280/432 |
| 2008/0205877 A1 | 8/2008 | Stanev et al. | |
| 2008/0303900 A1 | 12/2008 | Stowe et al. | |
| 2009/0236480 A1 | 9/2009 | Lai | |
| 2012/0257086 A1* | 10/2012 | Nakasugi | G06T 3/4038 |
| | | | 348/239 |
| 2014/0247338 A1* | 9/2014 | Kessler | E03F 7/12 |
| | | | 348/84 |
| 2014/0273678 A1* | 9/2014 | Meyer | B63B 22/22 |
| | | | 441/31 |
| 2016/0373699 A1* | 12/2016 | Torres | G05D 1/0038 |
| 2017/0155832 A1* | 6/2017 | Oshima | H04N 5/232 |
| 2017/0272626 A1 | 9/2017 | Harrison | |
| 2017/0345536 A1 | 11/2017 | Breiwa | |
| 2018/0128422 A1 | 5/2018 | Jasko | |
| 2018/0136546 A1 | 5/2018 | Clearman | |

\* cited by examiner

REMOTE CONTROLLED ROTATING CAMERA MOUNT

This application is a continuation-in-part of, and claims priority to U.S. application Ser. No. 15/398,646, filed Jan. 4, 2017, the specification, claims, and drawings of which are hereby incorporated fully by reference. U.S. application Ser. No. 15/398,646 claims priority to U.S. Provisional Application 62/299,934, filed Feb. 25, 2016, the specification, claims, and drawings of which are hereby incorporated fully by reference. Some of the claims herein are claims to subject matter that was disclosed but not claimed in application Ser. No. 15/398,646. Nothing herein should in any way be taken to limit the scope of the inventions discussed in application Ser. No. 15/398,646 or 62/299,934.

FIELD OF THE INVENTION

This invention relates generally to the field of camera mounts, and more specifically, to the field of camera mounts for cameras that are used for filming moving objects.

Digital cameras and other cameras with the ability to take video footage have become more common in recent years, and they are used for many different purposes. These purposes include, but are not limited to, the following:

Users can film themselves or other people from a first-person or third-person perspective, on boats, automobiles, motorcycles, or in other places.

Users can also film wildlife, such as birds, fish, or mammals, or other animals.

In many cases, a camera requires a mount, which is a device that holds the camera. This can be useful, for example, when the user is trying to film a moving object, when the user is trying to ensure that the camera does not wobble during filming, or, when the user wants to film something and cannot hold the camera himself.

Camera mounts of the prior art do not include the capacity to move the camera, in a way directed and controlled by the user, using wireless technology. Camera mounts of the prior art also do not move using their own power. A user will need to physically move or rotate a mounted camera of the prior art, if the object the user is trying to film moves out of the camera's view. This is obviously impractical, because the user may be driving a boat or an automobile, and may not be physically able to move the camera.

For purposes of this application, a "perspective" is a view from which a camera is filming. If a camera is filming events from one perspective, the camera's owner can rotate the camera 90 degrees and capture events from a different perspective perpendicular to the first perspective. The camera's owner could also capture events from other perspectives that are different from, but not necessarily perpendicular to, the first perspective.

Examples of situations where a moving camera mount will be useful include occasions when the user is trying to film a moving automobile, and wants the camera to move in conjunction with the automobile, to keep pointing at the automobile. The user would employ a camera mount to move the camera's position so that it continues to point at the automobile.

The user could also need to use a camera mount to hold a camera filming the perspective of the user when he or she is driving an automobile, airplane, or a boat. In these cases the user will be too busy driving the vehicle to hold the camera. Furthermore, the user may need a camera mount to hold the camera, which is filming from the perspective of an airplane, helicopter, or drone. A user might wish to "pan" around the vehicle and show everything that is happening around the vehicle. The camera will then have to turn 360 degrees, which means that the user will need to manually move the camera 360 degrees. In all these cases, the user will be trying to create a film from a certain perspective or group of perspectives. In general, a camera mount will be most useful when a user wants to create a film, and a human being cannot hold the camera, or it is too expensive for a human to hold the camera.

Extreme sports and racing have become more common in recent years. In extreme sports, a participant will often want to film the perspectives from inside a vehicle, and will have a camera there. However, the participant cannot change the perspective being filmed by the camera, without stopping the vehicle and manually adjusting the camera. This is obviously impractical if the participant is racing or participating in an extreme sport.

GoPro has created one of the most popular digital cameras presently in use, and other companies have created digital cameras as well. The camera mount of the present invention is compatible with all of these cameras.

Users can sometimes address the problems described above by using multiple cameras to film the same event from different perspectives, but this is not appropriate for every situation. Furthermore, if multiple cameras are used, they will cost more than one camera, and also the video will have to be edited together afterwards. Many users do not know how to edit videos, or do not have the required software or computer hardware to do this. Video editing also requires time, which imposes an additional cost.

A need clearly exists for a camera mount that can be controlled remotely, and which can turn the camera 360 degrees in a complete rotation, to keep track of an object moving around the camera. Such a camera mount should also ideally be capable of "pausing" in mid-rotation to keep the camera focused on a certain direction. The camera mount should have more than one possible speed, as well, so that the camera can be moved at the speed desired by the user, and so that the same camera can be used at different times to track objects moving at different speeds. A user can use this camera mount to create film that the user would not have been able to create otherwise, or would have had to create at an increased cost.

This camera mount should be able to rotate the camera up and down, if possible.

It is also useful for this camera mount to be small enough to be transported easily, and small enough that it can fit easily in locations where it might be placed for filming. Furthermore, the camera mount should be capable of being easily attached to as many types of camera as possible, and particularly should be capable of being easily attached to GoPro cameras, which are one of the more popular types of small video cameras on the market today.

RELEVANT PRIOR ART

Patent Application 2010/0193658 by Beger et. al. describes a video monitor mount that can be placed on a wall. The mount is used for items such as televisions, so that they can be rotated to face viewers located in different areas of the room where the televisions are located. This is substantially different from the present invention. The machine that allows Beger's invention to rotate is much larger than the rotating mechanism (4) of the present invention, which means that Berger's invention is effective for wall-mounted television sets, but not effective for smaller, free-standing devices such as digital cameras. The rotating mechanism (4) of the present invention is also different in design from the rotating mechanism of Beger's invention. Furthermore, Beger's invention does not have anything like the wireless interface of the present invention, that allows the user to control the digital camera of the present invention from a distance.

Patent Application 2002/0172518 by Watson describes a motorized pan and tilt apparatus, which enables a wide range of devices, including cameras, to be controlled. Watson's invention is also different from the present invention, because Watson's invention does not include any capability similar to the wireless interface of the present invention. Furthermore, it is not possible to simply take a relevant wireless control software and add it to the Watson's invention to approximate the present invention, because the present invention includes a stud specially designed for cameras, where the stud is the same as the stud used to attach cameras to tripods. The present invention also includes proprietary software.

Patent Application 2008/0303900 by Stowe et. al. discusses a pan/tilt camera system that uses magnetic fields and mirrors to project an image to the camera. This mechanism has a highly specific mechanical construction, and the present invention has different mechanical construction.

Patent Application 2009/0236480 by Lai discusses a simple rotary device for cameras, that uses magnets to function. This device does not include the multiple settings and wireless capabilities of the present invention.

U.S. Pat. No. 5,463,432 by Kahn describes a computer-controlled pan/tilt camera mount. It does not include a "wireless" or remote device, however, and it appears to be designed for small payloads.

U.S. Pat. No. 5,555,019 by Dole describes a complex system for using toys to make videos, and to keep track of how the toys are moving, and the effects upon the picture. A method of accomplishing this is mapped out within the patent. Dole's invention has a fundamentally different purpose from the current invention, and does not include anything similar to the current invention's remote controlled camera mount that can change the camera's direction on command.

U.S. Pat. No. 7,667,769 by Gao et. al. describes a triangular camera rotation device. This device does not appear to have the wireless capabilities or remote control of the present invention.

TERM NUMBERS

These term numbers were used in application Ser. No. 15/398,646, and they also apply to this application:

Base (1). Remote Control (2). Rotating Mechanism (4). Base Memory (5). Exterior Screw Mount (6). Base Battery (7). Charging Port (8). Base Wireless Receiver (9). Base Wireless Transmitter (10). Stud (11). Base Motor (12). Base Program (13). Gear Drive (14). Remote Battery (15). Remote Wireless Transmitter (16). Remote Program (17). Remote Wireless Receiver (18). Remote decoding board (19). Interior Screw Mount (20). Gear reduction unit (21). LED light (23). Disk (24). Position locating hole (25). Light sensor (27). Motor control board (28). Propan360 decoder (29). Pin assignment module (31). Pin input deconstruction module (32). Base processor (34). Commanding module (35). Altitude changer (36). Incliner (37).

All of these components were shown in the drawings for application Ser. No. 15/398,646.

In one embodiment, the base (1) further comprises a base memory (5), and a base processor (34) that includes the motor control board (28), and Propan360 decoder (29). The motor control board (28), and Propan360 decoder (29) can be separate components, though.

The gear drive includes a gear reduction unit (21) in some embodiments.

The program component in the primary embodiment includes the following modules: Pin assignment module (31). Pin input deconstruction module (32). Commanding module (35).

SOME USES OF THE INVENTION

The primary embodiment of the machines of the present invention is a cylindrical camera mount, that is controlled by a remote control. The camera mount contains a motor, and is able to rotate a camera up to 360 degrees, counter-clockwise or clockwise, at several speeds. The camera mount can also pause in the middle of rotation. The camera mount, the remote control, and the components they incorporate, are collectively called the "ProPan360" by the inventor.

The camera mount is designed in such a way that the user can place a digital or other camera on top of a screw mount, that projects upwards out of the main cylindrical part of the embodiment. The screw mount in most embodiments has a "¼-20" or "quarter-20" stud attached to it, which any digital camera, and most other types of cameras, may attach to. The "¼-20" stud is the standard stud that is placed on tripods to attach them to cameras. The camera will rotate as the screw mount rotates.

In an alternative version of the invention, the stud projects upwards directly from the main cylindrical part (base) of the embodiment, and the camera can be attached to the stud. The camera will rotate as the stud rotates.

Another type of stud could theoretically be used with the camera, either via being attached to the base through a screw mount or through projecting upwards directly from the base, but the "¼-20" stud is preferable, because it is the standard stud used to fit cameras to tripods.

The limitations in camera mount technology mean that there are many videos where the user has mounted their camera on the front of an automobile or boat and turned the camera on to film, as the user moves down a street, race-course, or off-road, or, in the case of a user driving a boat, the user moves on a lake or ocean. This gives only one perspective view and may become boring to the viewer very quickly. The present invention will allow the user to pan and rotate the camera from inside the vehicle or boat and get many different shots from different perspectives, to make for much more interesting video footage.

Currently, the only way to move the camera, in these situations discussed above, to get a view from a different perspective, is to stop the automobile or boat and physically go to move the camera. This is not practical, especially if the user is racing at the time. The camera mount described here will allow the driver or a passenger to simply push a button on the remote control and change the camera's perspective.

Digital cameras have a recording capability, which allows them to make long video records. The present invention can be used to rotate a camera to keep the significant portions of a scene in "frame", creating a lengthy and interesting video.

A user can also place the invention on a boat that is moored, or otherwise not moving, or an automobile or other vehicle that is not moving, and the user can then tell the base to pan 360 degrees continually. This allows the user to view what is going on around the boat or other vehicle, thus a camera attached to the base can be used as a security camera.

The Base

Many digital cameras have a 160-degree field of vision. The base (1) of the present invention can rotate 360 degrees, allowing the camera to rotate 360 degrees, so the digital camera can capture everything around it. 160 degrees of the 360-degree field of vision will be captured by the camera at a time, but all of the 360-degree field of vision will be captured by the camera during some part of its rotation as it rotates.

The base (1) is the part of the invention that holds the camera, and rotates the camera. The preferred embodiment of the base is cylindrical and about 4 (10.16 cm) inches tall, 3.375 inches (8.5725 cm) in diameter, and has an outer shell made of a sturdy plastic, so as to be resistant to dust. Plastics that will suffice for this task are available in the prior art. This form is preferred because it is compact and protects the internal components of the base (1). This form also holds all the necessary components of the base. It is not necessary to form the base (1) in this manner, however, and other structures that can and do house the base's necessary components will suffice to act as the base for purposes of the invention. The base in the preferred embodiment includes at least following components: The Rotating Mechanism (4), Base Memory (5), Base Battery (7), Charging Port (8), Base Wireless Receiver (9), Stud (11), Base Motor (12), Base Program (13), and Gear Drive (14). The base may also include the Base Wireless Transmitter (10) and other components discussed above.

In another component, the screw mount (6) protrudes up directly from the main part of the base, and the stud (11) is attached to the screw mount (6).

The charging port (8) is either a plug port, an "Iphone" port, or one of the standard types of power charging ports in the prior art. The charging port (8) is connected to the base battery (7) in a way that allows the charging port (8) to receive power (In some embodiments the charging port is plugged into an outlet or another device), and electrical power received from the charging port (8) charges the base battery (7).

The base battery (7) is a battery that provides electrical power for the device, and has connections to the Base Wireless Receiver (9), Base Motor (12), and base memory (5), allowing the base battery (7) to power these components. The base battery (7) also has a connection to, and powers, the Base Wireless Transmitter (10) if the Base Wireless Transmitter (10) is present. The base battery (7) should also have connections to any other electrically powered components of the rotating mechanism (4), such as the microcontroller in embodiments where a microcontroller is used.

Lithium ion batteries are recommended for use as the base batteries, because of their long life. It is also highly recommended that the base batteries be rechargeable. 2-S LIPO Approx. 800-MAH would probably be most appropriate for the base battery, and 150-200 MAH batteries would probably be most appropriate for the remote battery.

There will probably be an estimated range of communication of 200 feet between the remote control and the base. The main shaft that rotates the stud in the preferred embodiment would probably be ¼ inch wide, 20 Pitch, made of metal, and supported by two sealed bearings, to rotate the stud and any attached camera when under heavy loads.

The Base Wireless Receiver (9) is a wireless receiver component that receives wireless signals from the remote control, and is operatively connected to the ProPan360 decoder (29), so that the base wireless receiver can transmit these signals to the ProPan360 decoder. The ProPan360 decoder is also connected to the base memory (5), and the ProPan360 decoder interprets these signals according to instructions given to it by the base memory (5), which gets these instructions from the base program (13). The ProPan360 decoder then, in some embodiments, transmits these interpreted signals to the motor control board (30). This transmission does not need to be wireless, but can be wireless. The motor control board then causes the rotating mechanism to make appropriate movements, to fulfill the user's instructions, based on instructions that the motor control board receives from the base memory (5), which is running the base program (13). The base program (13) determines the appropriate movements for the rotating mechanism to make, and the base memory sends this information to the motor control board. The motor control board (30) controls the rotating mechanism, and causes the rotating mechanism to rotate according to the command received from the remote control. The stud rotates accordingly, and the camera, which is attached to the stud, rotates as well.

The rotating mechanism may rotate the camera, clockwise or counterclockwise, by the appropriate number of degrees, at the appropriate speed, and the rotating mechanism may also pause rotation of the camera, or may execute whatever other command has been received from the remote control.

In an alternative embodiment, the ProPan360 decoder transmits the interpreted signals to the base memory (5), and the base memory (5) then uses the base program (13) to determine the appropriate instructions to send, and then sends instructions about the required movement for the rotating mechanism to the motor control board. This is different because here the instructions flow from the ProPan360 decoder to the base memory, and then to the motor control board, whereas in the first embodiment the instructions flow directly from the ProPan360 decoder to the motor control board.

In other embodiments, the ProPan360 decoder and the motor control board do not consult with a centralized base memory, but the ProPan360 decoder and the motor control board each contain part of the base memory, with some or all of the modules of the base program. The ProPan360 decoder utilizes that part of the base program which it comprises, to decode the signals that the ProPan360 decoder has received, and transmits the decoded signals directly to the motor control board, which uses those modules of the base program which the motor control board comprises, to determine the appropriate movements that the rotating mechanism needs to make, to fulfill the instructions received from the user.

The transmissions of information between any of the base wireless receiver, ProPan360 decoder, base memory, and motor control board, do not need to be wireless, but can be wireless.

The Base Program (13) interprets the signals, decides the meaning of the signals, possibly based on pre-programmed information about the meaning of each signal, and then the Base Program (13), in accordance with the signals received from the remote control, tells the motor control board to command the rotating mechanism (4) to execute the commands contained within the signals. The rotating mechanism may rotate the camera, clockwise or counterclockwise, by the appropriate number of degrees, at the appropriate speed. The rotating mechanism may also pause rotation of the camera, or may execute whatever other command has been received from the remote control.

Other Electronic Components within the Base

The same component can execute the functions of more than one of the base memory (5), Base Wireless Receiver (9), and Base Wireless Transmitter (10), motor control board (29), and ProPan360 decoder (30), provided that this component can execute all of these functions that it is required to perform.

A microcontroller may be used to perform the tasks of the ProPan360 decoder and motor control board and base memory. In the preferred embodiment, the ZX-24 microcontroller is used. Other microcontrollers may also be used for this purpose.

One version of the base memory (5) in the preferred embodiment is part of the ZX-24 microcontroller. It can be programmed with the base program (13), and can command the base motor in the manner described herein.

The Base Program (13) is stored on the base memory (5) which should be a computer chip or other form of electronic storage capable of executing computer programming instructions. The Base Memory (5) controls, and is operatively connected to, the Motor control board (30) and Propan360 decoder (29).

The motor control board (30) is operatively connected to the Rotating Mechanism, Base Motor, and Gear Train, and the Base Program tells the motor control board (30) to command the Rotating Mechanism, Base Motor, and Gear Train to perform their required tasks. The Base Program (13) is a computer program that, among other things, tells components of the base to execute the instructions received from the user's remote control (2).

The base will allow the camera to rotate 360 degrees. The base is battery operated and is controlled by a wireless remote control.

In the first embodiment, the remote control will allow the user to rotate the stud (11). The camera is attached to the stud and will also rotate. The remote control will allow the user to rotate the stud, with the camera attached to the stud, clockwise or counter clockwise. The stud should have a 360 degree range of rotation, therefore the camera will, as well. The user can choose to rotate the stud (and camera) 90 degrees, 180 degrees, 270 degrees or 360 degrees from its position, or use the remote control to tell the base to simply rotate the stud either clockwise or counterclockwise. The remote control and the mechanisms within the base will also allow the stud, and the attached camera, to rotate in 3 speeds, slow, medium and fast, plus a pause function to stop the rotation anywhere in the cycle and restart the rotation.

In another version of the invention, the stud will be attached to the screw mount, and any mounted camera will be attached to the stud. The remote will therefore allow the user to rotate the screw mount and the camera the same way.

The rotating mechanism (4) is the part of the invention that actually rotates the camera, and it is explained further below. It is also part of the base.

It is important to note that the base does not need to have the form which it has in the first embodiment. The base can have another form, as long as the base also contains a stud capable of rotating 360 degrees, and a means of attachment of a camera to the stud.

The invention can also include another means of attachment of the camera to the stud, instead of the screw mount. The stud is used because a ¼-20 stud is used by all cameras to attach to tripods. Therefore, a ¼-20 stud can also be used by all cameras to attach to the camera mount of the present invention. However, if another means of attachment will also attach the camera to the base, that means of attachment may also be used. Certain specifically adapted cameras can also be used with specially adapted means of attachment that are attached to the screw mount.

The invention can also include more rotation speeds besides slow, medium, and fast. There is nothing within the programming or other parts of the invention that would prevent a specific implementation from having more or fewer than three speeds.

A base with more than three rotation speeds could only be used effectively with a remote control that has the ability to transmit instructions to the base to engage in more than three rotation speeds. A base with more than three rotation speeds could only be used effectively if the base program includes the ability to interpret commands to rotate at the additional speed levels, and to transmit the information about the desired rotation speed to the motor control board. The base motor and gear drive would also have to be capable of performing the required movements to cause the stud to rotate at more than three speeds.

The Means for Adhering

The base should have a means for adhering on its bottom or elsewhere on the base. The means for adhering is a part of the base that causes it to adhere to other things, thus helping to ensure that the base will not fall over, with a camera attached to it while filming, and also ensuring that the base can be placed upside-down, on its side, or in other places where the base is not upright. The means for adhering will ensure that the base stays in such a position when the base is placed in this position. The means for adhering will cause the bottom of the base to adhere to another object, thus staying in the position where the base is placed.

One example of the means for adhering is that the base might have a ¼ inch female threaded socket on its bottom. A user can then screw this socket into another object. The base will then be attached to the object and placed in its intended position.

Another example of the means for adhering is a "double-tape" system where tape which is sticky on both sides is placed on the bottom of the base. The user can then place the base in a desired location (such as the hood of an automobile), and the tape on the bottom of the base will stick to the location, thus adhering the base to the desired location.

The means for adhering can also be a small coaster-like implement, with "double-tape", adhered to its bottom. The coaster-like implement will also have a snap-fit feature, or other feature which allows the base to interlock with the coaster-like implement. The base will have a corresponding snap-fit feature, or will be otherwise shaped so that it can interlock with the coaster-like implement. The coaster-like implement will stick to the underlying surface, in the desired location of the base, and the base will interlock with the coaster-like implement, therefore the base will remain in its desired location.

The LED Lights

It is important to note that the invention requires a means of determining the position of the camera, and a means of monitoring the position of the camera as it rotates. There must also be a means of detecting when the camera reaches the desired position, and stopping continued rotation of the camera. The below components fulfill these functions in one embodiment. However, other components could potentially fill these functions as well. Such components are explicitly included within the scope of the claimed invention.

The base in one embodiment contains a positioning locating hole (25) and four light sensors (27). The light sensors are below the disk. The disk is part of the rotating mechanism. There are also four LED lights (23) above the disk, at specific positions. Viewed from below the disk, the LED lights are at 90 degree positions relative to each other, using the disk as a reference. The LED lights are spaced evenly around a circle, and directly above the disk. The figures illustrate how they are spaced.

The LED lights each make a different image, so that it is possible for a viewer to tell which individual LED light (23) the viewer (or a sensor) is seeing, from looking at the image produced by that LED light (23). Each LED light (23) is directly above one of the light sensors (27) with the disk (24) in between the LED lights and the light sensors.

The disk generally physically blocks direct light transmission from the LED lights to the light sensors. However, the disk has a hole, the position locating hole (25). As the disk rotates, the position locating hole rotates with it, and if the position locating hole passes between one of the LED lights and the light sensor directly below that LED light, then the light from that LED light will shine on the light sensor below it, and that light sensor will detect the light from that specific LED light directly above it. The light sensor will be able to tell which of the LED lights it is sensing, because each of the LED lights is different. At least one of the light sensors will therefore be assured to detect the change in position of the disk, via the position locating hole, every time the disk rotates 90 degrees. The changes of the position locating hole will indicate the changes of the position of the camera, so at least one of the light sensors will detect a change in the position of the camera every time the camera rotates 90 degrees.

The base could theoretically include more than four light sensors, and/or more than four LED lights, and, if it does so, the base program and other components of the base should be modified accordingly. The base program would have to be modified to accept input from all of the light sensors. The number of LED lights should be equal to the number of light sensors, for the invention to operate with maximum effectiveness. If there are more than four light sensors, then the base program would be able to monitor the input from all of these light sensors, to more precisely monitor the rotation of the disk, and the position of the camera, as the disk rotates. If there are more than four light sensors, the angle between them will be less than 90 degrees. As the disk rotates, the light sensors below it will be able to monitor the changes in the position of the position locating hole more precisely than they would if there were four holes, because a sensor will detect one of the LED lights, and communicate this with the base program, every time the position locating hole passes below an LED light. The position locating hole will pass below one of the LED lights every time the disk rotates less than 90 degrees, provided that the light sensors are positioned evenly in a circle with the same number of degrees between them, and the LED lights are positioned evenly in a circle with the same number of degrees between them. The changes of the position of the position locating hole (25) will indicate the changes of the position of the camera, so the light sensors will detect a change in the position of the camera every time the camera rotates less than 90 degrees.

The light sensors communicate with, and are connected to, the motor control board (28), so that the motor control board (28) knows when the disk, and by extension the camera, have reached a certain point. The motor control board (28) communicates with the base memory, (5), where the base program takes account of the movements that the disk has made, and issues appropriate commands to the motor control board (28) to complete the camera movement that the user desires.

In other embodiments, the light sensors will communicate directly with the base memory (5) and inform the base memory (5) when the disk (24) has reached a certain position. Each light sensor will note when the position locating hole (25) has reached a position where the light above it can be detected, and will detect that specific light. The base program (13) will then take this information into account, and issue appropriate commands to the motor control board to fulfill the camera movements desired by the user.

In still other embodiments, there will be no separate base memory, and so the light sensors will communicate with the motor control board (28), and the part of the base program (13) that is stored on the motor control board (28) will make the necessary calculations and issue appropriate commands to the motor control board (28), which will command the motor and gear reduction unit appropriately.

The rotating mechanism within the base is capable of rotating at three speeds. As a result, the base battery and charging port can be configured to allow at least three different levels of power input, or voltage, one for each speed. In the preferred embodiment, each speed of the base will require a different power level. Therefore, the base has three power levels, one for each speed. Again, the base could theoretically have more than three speeds, and more than three power levels.

The Rotating Mechanism

The rotating mechanism in some embodiments comprises at least the following components: The base motor, gear drive, screw mount, and stud. In some embodiments, the rotating mechanism also includes, among other components, four LED lights (23), a disk (24), and a gear reduction unit.

The gear reduction unit, in embodiments where it is utilized, is important because it changes the motion and torque of the gear drive, when necessary, enabling the speed of the gear drive to slow down when the user gives a command to reduce or stop the invention's rotation speed. This allows the camera to turn more smoothly.

The base motor is the component within the rotating mechanism that receives the commands from the motor control board, and ultimately the base program. The base motor receives electricity from the battery in the preferred embodiment. The amount of electrical power received can be controlled by the base motor (12). In the preferred embodiment, there are three possible levels of the amount of electrical power that the base motor will receive from the battery. These levels represent the amounts of electrical power needed to make the base rotate at "slow", "medium", and "fast" levels. The base motor (12) will ascertain the amount of power, expressed in voltage, required, depending on whether the base motor has been commanded to rotate "slow", "medium", or "fast" by the base program (13). The connection between the battery and base motor allows for at least these three different amounts of electrical power to be sent from the battery to the base motor.

In the first embodiment, the base motor moves and rotates the gear drive. The gear drive connects to the gear reduction unit, which modifies the torque and force created by the gear drive, in accordance with any commands received from the base program that require action by the gear drive. The gear train is a part of the gear drive. The base program selects the moves that the camera must make, to fill the user's commands, and then sends commands to the motor control board, which in turn sends these commands to the motor and the gear reduction unit. The gear reduction unit will modify the torque created by the motor, when, for example, the user wants the camera to switch directions of rotation. The motor and gear reduction unit are connected to the motor control board and receive input from it. The gear reduction unit transmits the motion created to the screw mount and disk, and rotates both of these in unison in the desired manner. The disk can be directly mechanically attached to the screw mount or stud, to make sure that the disk rotates in unison with one of these components. The screw mount can be an interior screw mount, or exterior screw mount. In some versions of the invention the camera is affixed to the exterior screw mount with a stud. When the screw mount rotates, the camera rotates with it. In other versions of the invention, the screw mount is an interior screw mount, the stud projects directly up from the body of the base, and when the stud rotates, the camera rotates with it. In these versions, the gear reduction unit transmits the motion created to the stud and disk, and rotates both of these in unison, in the desired manner.

The exterior screw mount points vertically upwards, and the camera attaches to the screw mount via the stud. This enables the camera to rotate up to 360 degrees as the screw mount rotates.

In other versions of the invention, the stud can rotate 360 degrees, causing a camera attached to the stud to be able to rotate 360 degrees.

The stud should be a "quarter 20-inch" stud, because all cameras use "quarter 20-inch" studs to attach to tripods. "¼-20 inch" refers to the following: The diameter of the stud or screw is ¼ of an inch, and the number of threads per inch of the stud or screw is 20. Therefore, all cameras can attach firmly to the screw mount via quarter 20-inch studs. The camera mount of the current invention can be used with any camera that can be attached to a tripod.

In embodiments of the invention containing a base wireless transmitter (10), the base wireless receiver and base wireless transmitter are connected to the base memory, and when the motor executes functions such as causing the camera to rotate, the base memory transmits this information to the base wireless transmitter, and the base wireless transmitter transmits this information to the remote wireless receiver on the remote control.

In some embodiments of the invention, the stud (11) will project upwards directly from the base, and the interior screw mount will be limited to a structure inside the base, where the interior screw mount will grip the part of the stud inside the base. The interior screw mount will move the stud (11) and make the stud rotate when the gear drive moves the interior screw mount.

The base of the present invention can be made water-resistant by covering it with a water-resistant covering. It can be made waterproof by covering it with a waterproof covering at greater costs. Waterproof and water-resistant substances that function for this purpose are part of the prior art. The inventor believes that most of the bases of the present invention, that will be manufactured, will be water-resistant, because of the greater cost of waterproof coverings.

The hardy water-resistant covering of the base, that the inventor envisions manufacturing, will keep the internal components of the base safe if, for example, the base (1) is left out in the rain, or if water is splashed on the base. In most embodiments, the base (1) will not be able to withstand prolonged immersion in water, and so the base (1) will not be waterproof, as noted above.

The base and remote control should also be dust-resistant, because of the many times that they may be used in deserts or in other places where they might encounter dust from moving vehicles or other sources. Hardy plastics, of the types that the base and remote control should be made of, are generally dust-resistant.

Most embodiments of the base will also have an on/off switch that can turn the base on or off.

The "slow" speed of the base in the first embodiment is about two rpm (revolutions per minute), the medium speed is 4 rpm, and the fast speed is 8 rpm. Other speeds are possible, especially, but not only, in the range between 2 rpm and 8 rpm. The camera mount will rotate at a speed of 4 rpm unless the user commands it to rotate at one of the other speeds, therefore 4 rpm is the default speed. Another default speed is possible, and embodiments of the camera mount with other default speeds are possible.

The Remote Control

Most remote controls are not waterproof, and so cannot be used easily underwater or in other extreme conditions such as during rainstorms. The remote control of the present invention can be made water-resistant by covering it with a touch-sensitive covering that is water-resistant. It can be made waterproof by covering it with a waterproof covering at greater costs. Waterproof and water-resistant coverings that allow the user to use the remote control by pressing its buttons are part of the prior art. The inventor believes that most of the remote controls of the present invention, that will be sold, will be water-resistant, because of the greater cost of waterproof coverings.

The remote control should be made of a rugged plastic material. This will help it to survive damaging conditions such as sand being blown on the remote control.

The remote control can contain computer processor(s) and a memory, and the relationship between the physical components of the remote control is configured to take advantage of the special programming which is part of the programmed component. This makes the remote control a specially programmed computer.

The remote control allows the user to control the camera mount from a distance. This is vitally important, because in many places, the user cannot be next to the camera mount, to control the camera mount by hand. For example, if the user is piloting a boat, where the camera mount is placed with a camera, the user will not be able to control the camera mount by hand while driving the boat. The user will need the remote control.

The remote control in the preferred embodiment comprises a Remote Battery (15), Remote Wireless Transmitter (16), Remote Wireless Receiver (18), and Remote decoding board (19), an outer case, and several buttons that tell the base to perform different functions.

These buttons include an on/off button, a "pause" button which tells the motor to temporarily stop rotating the screw mount, and directional buttons for "forward", "back", "left", and "right", which tell the motor to cause the screw mount to go in these respective directions. There are also "speed" buttons that can tell the base to rotate at "slow", "medium", and "fast" speeds. The buttons also include a "360 degree" button, which tells the motor to cause the screw mount to rotate in 360 degrees, directional buttons that tell the motor to cause the screw mount to rotate clockwise or counter-clockwise, and buttons that tell the motor to control the speed of the screw mount as "slow", "medium", or "fast". There are also buttons that tell the screw mount to rotate 90 degrees, 180 degrees, 270 degrees, and 360 degrees, either clockwise or counterclockwise.

Versions of the remote control can fulfill the above tasks for embodiments of the base containing an interior screw mount, and embodiments of the base containing an exterior screw mount.

The buttons all connect to the remote decoding board. When the remote decoding board receives an input from one of the buttons, it queries the remote program for the appropriate signal to send, which will be a signal specific for that button. The remote decoding board then tells the remote wireless transmitter to transmit the appropriate signal to the base, where the base wireless receiver (9) will receive the signal.

Some embodiments of the invention include a Remote program (17), which is a program stored on the remote decoding board, that tells the remote decoding board how to encode the commands that the user has transmitted by pressing the buttons.

The roles of one or more of the remote wireless receiver, remote wireless transmitter, and remote decoding board, can be filled by a single component, provided that this component has the ability to fulfill multiple functions.

It is also possible to design the remote so that there is no remote program, and the remote decoding board is physically designed to tell the Remote Wireless Transmitter (16) to send a specific, different signal when each button is pressed. The remote may also be designed so that the buttons have a direct connection to the Remote Wireless Transmitter (16), so that the pressing of each button directly causes the Remote Wireless Transmitter (16) to send a different, specific signal.

The Remote Wireless receiver (18) is present in embodiments containing the Base Wireless Receiver (10), and receives signals that the Base Wireless Receiver (10) has sent from the base. The Remote Wireless receiver (18) communicates this information to the remote decoding board. This information may include information about whether a previous movement of the screw mount (such as a 360 degree turn) has completed.

The remote battery is a rechargeable battery that is connected to the Remote Wireless Transmitter (16), the computer hardware housing the Remote Program (17)(if applicable), Remote Wireless Receiver (18), and Remote decoding board (19), in a way which enables it to provide electrical power to these components. Lithium ion batteries are recommended for the remote control battery(s). It is possible for the remote control to be effective without rechargeable batteries. Regular batteries would suffice, though rechargeable batteries are preferred.

It is expected that the remote control will be about 0.25 inches (0.635 cm) thick, and slightly wider and longer than a credit card. If the remote control is larger or smaller than this, however, this should not affect the functioning of the claimed invention.

The remote control in the preferred embodiment should be "water-resistant" in that, if rain falls on it, or water is splashed on it, the remote control will not be significantly damaged. One way to achieve this is to give the remote control a "membrane cover", which is a type of touch-sensitive cover that covers the buttons of the remote control. Membrane covers are part of the prior art.

A single-chip wireless remote where the single chip fulfills the purpose of the remote decoding board and remote memory and the remote decoding board is available, and can be used successfully as part of the current invention.

The Base Program

The methodology for controlling the movements of the camera is complicated, and will be described below.

The movement of the camera should ideally be controlled by a processor equipped with a base program that responds to commands from remote controls. The base program should be adapted for the specifics of the base that it controls. For example, if the base includes more than four LED lights and more than four light sensors, spaced evenly around the disk in the manner described above, the base program should be adapted to acquire input when the hole in the disk passes in between any of the lights and the corresponding light sensor, and use this information to precisely stop the stud and camera from rotating when the user desires.

One method of creating the base program involves using a ZX-24 microcontroller to cause the base to rotate, and programming the microcontroller using QBasic. The ZX-24 microcontroller is manufactured with the ability to be programmed with the QBasic language, and a QBasic system library is available, which contains subroutines that can be used to construct the base program. The ZX-24 microcontroller therefore includes the functions of the base processor, and also includes a memory which will serve the function of the base memory. The user, however, will have to use a considerable amount of time to write a QBasic program for the microcontroller, to control the base, and to rotate the base in response to commands from the remote control. A large number of subroutines would need to be made part of the base program, in order for the base program to function successfully.

However, the amount of time required to write the base program can be reduced considerably if the user follows the guidelines contained herein. These are not the only possible way to write the base program, but are one possible way to write the base program. The base program can also be written to operate an 8-bit microcontroller, but can also operate a more complex microcontroller.

The base program for one embodiment is optimized for the ZX-24 microcontroller. Another version of the base program that performs the same functions, using a different microcontroller, or different physical components that fulfill the functions of the base processor and base memory, would also be part of the present invention. The stud is supposed to be attached to the camera, therefore movements of the stud are supposed to directly correlate to, and control, movements of the camera.

The ZX-24 microcontroller has "pins", which are small physical components that stick out of the microcontroller and receive information from other components or send information to the other components. The base program includes "declarations", which are settings that declare pieces of memory where data is stored and held for comparison. The base program also includes "registers" which are arrays or groups of types of data that are received from another source, such as pins reading the present position of the disk.

The base program includes declarations which assign some of the pins on the micro-controller for directional positioning (input), and command information received from the base receiver (9) (input). The pins that are assigned for directional positioning receive input from the light sensors in embodiments that use light sensors. The base program also includes declarations that assign pins to control the motor (output) and tell the motor the necessary amount of force needed to create the rotation speed needed to execute the user's instructions (output), and declarations that assign pins to control the direction in which the motor and gear drive are supposed to turn the stud (output). The pins that control the motor can transmit information to the motor (via the motor control board in some embodiments), and any pins that control the gear drive can transmit information to the gear drive (via the motor control board in some embodiments).

The microcontroller receives each different type of input from the pins assigned to receive this type of input, via a declaration(s). This information is then entered into registers which the base processor performs calculations on, using the base program. When the base receiver receives a command in embodiments that possess light sensors, the microcontroller receives position sensing information from the light sensors and enters this information into a current position register. The information received by the base receiver about the desired movement of the camera and stud, and any desired final position of the camera and stud, is also entered into a final position register. The base program then calculates the movements that are necessary, for the stud to make, in order to fulfill the instructions from the user, so that the current position of the stud changes to the desired final position of the stud, and/or that the movement of the stud changes in the desired direction of movement, and/or that the movement of the stud changes in any other desired manner. The base program then calculates the amount of power, direction of rotation of the stud (and camera), and ending position of the stud (and camera) needed to execute the instructions received from the user. The base program includes variables that represent the amount of change in position of the stud that a given application of force from the base motor would create. The base program then transmits to the base motor the amount of power and direction of rotation that are required. The base motor then causes the stud to rotate in the desired manner. While this is happening, in an embodiment that possesses light sensors, the disk also rotates, and the hole in the disk rotates with it. The position locating hole passes between each light and the light sensor beneath that light, and as the position locating hole does this, the light sensors each continually transmit information to one or more of the pins in the microcontroller. The base program is continually comparing the information that the light sensors are sending about the current position of the disk to the information about the desired ending position of the disk that the base program has already calculated. The base program utilizes the gear reduction unit to ensure that the stud and camera stop rotating when the stud reaches the desired ending position calculated by the base program.

This particular ZX-24 microcontroller can operate about 14 million instructions per second, so embodiments of the invention can respond to changes in the input that the microcontroller is receiving from the pins every 0.002 seconds.

The exact code which is part of the base program will depend somewhat on the type of motor being used, and the size of the base, and other variables, but the base program should have the ability to discern the motor speed, and direction, that will be needed to fulfil the user's commands. The base program should ideally use variables representing characteristics such as the power of the base motor being used, the circumference, and/or diameter, and/or radius of the disk, the weight of components that comprise the rotating mechanism, any necessary allowance for friction, any information that the base program has received about movement the stud is currently making, and the current position of the stud. These variables will be used by the base program to calculate the tasks that the base motor will need to perform, and the amount of force needed to perform these tasks, and the times at which this force needs to be applied, to fulfill the user's instructions about the desired speed, direction, and final position of the camera that is included in the information that the user has sent and the base program has received. The base program thereby determines the necessary steps that the motor will need to make, in the manner described above, to turn the gear drive, to cause the stud, and camera, to move in the desired manner. The methods of calculating this information, once the variables listed above are known, are known in the prior art. The base program transmits the results of these calculations to the motor control board. The motor control board then causes the motor to perform the desired steps so that the stud, and camera, move in the desired manner. In an embodiment that uses a rotating disk, the rotating disk will rotate in conjunction with the stud, and, in an embodiment that possesses light sensors, the light sensors will inform the base program about the changes in the position of the stud as these changes happen.

The base program will have to be designed to reflect whether the base that this base program is designed to operate, employs an interior screw mount, with the stud projecting directly up from the body of the base, or an exterior screw mount, projecting up from the body of the base, with the stud attached to it. If the base employs an exterior screw mount, information such as the amount of rotation of the stud that a given amount of force from the motor creates, and allowances for friction, may be different.

Other Embodiments

In a different embodiment of the invention, there is no base charging port on the base.

In a further embodiment, the base charging port has a connection to the battery, and also direct connections to the Base Wireless Receiver (9), Base Wireless Transmitter (10), and Base Motor (12). The base battery is also connected to the Base Wireless Receiver (9), Base Wireless Transmitter (10), and Base Motor (12). The base charging port then transmits electricity to the Base Wireless Receiver (9), Base Wireless Transmitter (10), and Base Motor (12) while the base charging port receives power from a power source. The base charging port also charges the base battery during this time.

When the base charging port is not receiving power from a power source, the base battery charges the Base Wireless Receiver (9), Base Wireless Transmitter (10), and Base Motor (12).

In another embodiment, there is no base wireless transmitter (10) or remote receiver. The remote control can still transmit signals to the base, but signals cannot be transmitted from the base to the remote control.

In another embodiment, the remote control has a small solar cell, connected to the remote battery, which produces electricity and recharges the remote battery.

In yet another embodiment, the base has a small solar cell, connected to the base battery, which produces electricity and recharges the base battery.

In other embodiments, the base includes an altitude changer (36) and/or an incliner (37). The altitude changer

(36) is controlled by the gear drive. The gear drive causes the altitude changer to move vertically up and down, relative to the bottom of the base. The altitude changer will be attached to the stud, and will move the stud up and down. This will cause the camera attached to the stud to move up and down with it.

In such cases, the base program will include the ability to command the base processor to cause the gear drive to cause the altitude changer to move vertically up and down, relative to the bottom of the base.

If an incliner (37) is included in the base, the incliner (37) is controlled by the gear drive. The incliner (37) will be attached to the stud, in a manner that changes the incline at which the camera is pointing. This way, in a scenario where the base is on a level surface, the camera can be pointed at an angle upwards or downwards, to focus on objects that are above or below the camera. If the base is not on a level surface, the stud will be able to move the attached camera so that it can be pointed at an angle upwards or downwards relative to the base. An example of this is in the figures.

In such cases, the base program will include the ability to command the base processor to cause gear drive to make the altitude changer to move vertically up and down, relative to the bottom of the base.

A Method of Filming Using the Camera Mount

It is important to note, in this application, that when terminology such as "the base moving the camera" or "the user causing the base to move the camera" or "the user causing the screw mount to move the camera" or similar terminology, are used, this means that the user is using the remote control to communicate an electronic signal to the base receiver, and the base receiver and other components of the base then proceed with the tasks described above.

The current invention is also capable of working with any kind of camera. Some types of cameras which the current invention will function with include GoPro cameras, cameras that transmit using DSL, and handheld video cameras.

The GoPro camera was first used by a surfer, who took videos of himself as he surfed. He had to attach the camera to his arm or his chest. However, he could not control the camera and point it in the direction that he wanted, to create multi-perspective video footage. The ProPan360 camera mount solves this problem. With the ProPan360 camera mount, a surfer could theoretically attach the camera to a point on his surf board, and use a remote control to "pan" the camera around to show whatever he wishes of the surroundings, and film multiple perspectives, including a perspective of himself, if desired.

The camera attached to the camera mount of the current invention can also be used to transmit video footage electronically to another location, while the footage is being filmed. The camera may also store the footage within its own memory, where the footage may be retrieved and/or shown later.

A person using the camera mount can use it for filming, by placing a camera on the screw mount, and fastening the camera on the screw mount, using the stud. Then, the person can step away from the camera, and use the remote control to cause the screw mount to move the camera, to point the camera's lens in the direction(s) needed to create the desired film. The person may use the remote control to cause the camera to rotate to show a panoramic view, or a moving object. The person may also use the remote control to control the speed at which the camera rotates, and may pick a "slow", "medium", or "fast" rotation, in case the person is trying to film an object that is moving quickly. The person may also use the remote control to command the camera mount to cause the screw mount to move the camera in a "clockwise" or "counterclockwise" direction. The person may also use the remote control to command the camera mount to "pause" its rotation, thus pausing rotation of the camera. This allows the user to create a film focusing on a specific object.

A user can employ the camera mount to create an interesting film while filming or participating in a sports event, or extreme sports event. For example, the user can place the camera and attached base inside an automobile, and cause the base to move the camera to show a panoramic view of the landscape the automobile is driving past. The user can also cause the base to move the camera to show what the driver of the vehicle is able to see, from multiple angles, without the driver having to turn her head or body (because the camera will be turned to take in the desired views).

The user may mount the camera mount on the front or top of a vehicle, and take film of up to 360 degrees around, including the trail that the vehicle makes. For example, a person driving a dune buggy could focus on driving while the camera, mounted to a ProPan360 mount, takes footage of the track that the dune buggy is making, and the areas that the dune buggy is passing.

Many extreme sports events, particularly those posted on internet sites such as Youtube.com, involve video footage of what a driver of an automobile, airplane, or other vehicle can see while he approaches a certain point, or other footage of the view from inside the vehicle. The user can use the camera mount of the present invention to create such footage, showing multiple perspectives, by placing a camera inside a vehicle that is engaged in an extreme sports event, and using the remote control of the present invention to command the camera mount to rotate the camera while it is inside the vehicle. The camera will then create desired footage from as many perspectives as the user desires.

The user may also place the camera mount of the present invention, and an associated camera, on a boat, and the user can then use the remote control to command the camera mount to rotate the camera to capture desired footage from multiple perspectives. The user may also place the camera mount of the present invention, and an associated camera, inside, or on the outside of, an airplane, and use the remote control to command the camera mount to rotate the camera to capture desired footage from multiple perspectives.

The user could also, in principle, put the camera mount of the present invention, and an attached camera, inside, or on top of, an unmanned vehicle such as a drone, glider, or remote controlled (RC) car. The user could then turn on the RC car, and use a remote control for the RC car to command the RC car where to move, and where to turn, while simultaneously using the remote control of the present invention to film whatever images are desired, from the perspective of the RC car. The user may also fly a drone, with the camera mount, and an attached camera, fastened to the drone or glider. While the drone is flying, the user can then use the remote control to command the camera mount to rotate the camera, to capture footage desired by the user.

A user could also use the camera mount of the present invention to film animals, including wildlife. A user can place the camera mount, and an attached camera, in one place, and use the remote control to command the camera mount to rotate the camera to capture views of a specific animal. The user could also command the camera mount to rotate the camera to keep the animal in view as the animal moves. This is also useful because, with a camera attached to the ProPan360 camera mount, a user can track an animal and keep filming the animal by remotely controlling the camera mount without disturbing the animal. The user would have to manually adjust a conventional camera mount in order to keep filming the animal if it moves out of frame. This might disturb the animal, especially if the animal is a wild animal.

Children or students who wish to produce videos for school or other purposes could also use the ProPan360 mount to move a camera and use the camera to capture multiple perspectives for video projects. The children or students can then incorporate these videos into their projects without editing the videos. This is an important advantage because many children and students do not have video editing skills.

Individuals wishing to produce videos for presentations at work will be able to benefit by using the invention in a similar manner. In many cases, an individual seeking to create a presentation for employment will be operating under extreme time pressure. Such an individual would make use of the present invention's capacity for creating certain types of video without editing because this saves time for the person creating the video.

Security

It is possible to use the camera mount and base for security. The user will hold the remote control and command the base to move the camera into a position to take an object of interest, such as an intruder, into its view. The user can then command the base to move the camera, as the object of interest moves. The camera can move counterclockwise or clockwise to continue monitoring the object of interest within its field of view. The base can also move the camera 360 degrees, and can move the camera at a slow, medium, or fast speed, pause the rotation of the camera, or perform any of the functions listed by the remote control, in order to make sure that the camera keeps the object of interest within its view.

The base can also perform these functions, in order to cause the camera to monitor a large field of view, without tracking a specific object. For example, the base can rotate 360 degrees, causing the camera to rotate 360 degrees and monitor the entirety of the area that surrounds the camera.

One Example of Use of an Embodiment of the Invention

In this example, the user desires to make a video of a motorcycle that is moving past the user, and moving from right to left of the ProPan360. A digital camera has been attached to the stud (11). The user presses the buttons for "CCW" (counterclockwise), and "fast" on the remote control (2). The remote decoding board (19) receives this information, encodes it, and transmits it to the remote wireless transmitter (16). The remote wireless transmitter (16) sends the information, via wireless transmission, to the base (1), where the Base Wireless Receiver (9) receives the information, and sends it to the base processor (34), where the information goes to the ProPan360 decoder (29). The ProPan360 decoder (29) decodes the information, and sends the decoded command to the motor control board (28). The motor control board (28) queries the base memory, and sends the information about the movements desired by the user to the base memory, along with any information about the stud's current position and movements. The base memory (5) activates the base program (13). The base program (13) calculates the necessary tasks for the base motor to perform, using the variables listed above, and also using the current position register and any information about the desired final position of the stud that has been transmitted by the remote control. The base program then sends commands stating the action by the motor, needed to execute the desired movements of the stud, to the motor control board. The motor control board then causes the motor to execute these actions. The motor turns the gear drive, which is connected to the stud and rotating disk, and causes the stud and rotating disk to turn in tandem. As the rotating disk turns, the hole passes between the light sensors and the lights above them, and the light sensors continue to transmit information about the rotating disk's current position to the base memory. The base memory compares the current position of the register to any desired final position. When the disk indicates that the stud and camera have reached their desired final position, the base program transmits to the motor control board that the base motor should use the gear reduction unit within the gear drive to slow down and stop the rotation of the camera and stud.

Some Additional Uses of the Invention

A user making a film for later showing may need to use several cameras at different angles, to capture a single moving object such as a bird, as it moves along its trajectory. The user will have to edit the film together later. The current invention, however, allows a user to use a single camera to capture the whole course of the moving object, with no editing later. This makes filming using the camera mount of the current invention cheaper than previous methods of filming, especially for amateur filmmakers. A filmmaker can make a film using a camera mount of the current invention with further personnel, as well.

Many users wish to create a video that shows multiple perspectives, but do not know how to edit videos. Editing videos sometimes also requires additional expensive software. The present invention makes the additional work of editing videos unnecessary.

Charging

Application 15398646 stated "The charging port (8) is either a plug port, an "Iphone" port, or one of the standard types of power charging ports in the prior art." This includes the capacity for the base to engage in inductive ("wireless") charging, because wireless charging was created before Application 15398646 was filed.

Apple watches, introduced in 2014, have inductive charging capability. So do various devices using the "Qi" standard.

In inductive charging, power is transferred, using electromagnetic induction between two devices that are not physically connected. The present invention allows for the charging port (8) to receive power from a nearby wireless station, and charge this power to the battery. For example, the charging port can contain an induction coil that absorbs power from a magnetic field created by a second induction coil in a charging port.

The mechanics of "Resonant inductive coupling", which increases the range of wireless transmission, are also known in the prior art. The charging port (8) can use resonant inductive coupling to receive electrical charge from charging stations over a longer distance.

Some embodiments of the base use a "USB type C" charging port for the Charging Port (8). "USB type C"

charging is common in devices such as cellular phones and many other devices that are powered through USB ports.

The remote can include a charging feature of its own, which includes a "USB type C" charging port, or any of the other types of charging ports known in the prior art.

The remote can also use wireless charging. Application 15398646 specified that the remote battery (15) should preferably be rechargeable. The charging feature on the remote can therefore include the ability to use wireless charging to recharge the remote battery.

Use of a Program or "App" to Control the Base

It is possible, in some embodiments, to replace the remote control with a program or "app", saved on the user's cellular phone or computer (or another device with both the capability to run apps, and the wireless transmission capabilities of a cellular phone). These embodiments would probably use an app instead of a remote control. The app will be able to use the wireless transmission capabilities of the cellular phone, or other device (hereafter referred to simply as the "PC") to send commands to the base wireless receiver, and the components within the base will receive and interpret these commands in the same way as they would receive and interpret commands from the remote control, causing the stud to be moved as needed.

The app will be able to use the memory and graphic display capabilities of the PC in this manner: The user will be able to input, into the app, a set of commands for the base to execute in the future, and the time each command is supposed to be executed. The app will not send any of the commands to the base until the time arrives for the app to send that command. The user can program a series of movements, for the base to execute in the future, into the app, and then wait for the base to execute these movements at the appropriate times.

The inventor anticipates that the combination of the base and the app will be able to execute a complex sequence of timed commands, and use the transmission capability of the PC to send each command to the base wireless receiver at the time when that command should be fulfilled. An example is the following command sequence: At time=0, move 90 degrees to the left. At time=30 seconds, move back to starting position and then move 90 degrees to the right. At time=60 seconds, move 180 degrees to the right of starting position.

This theoretically allows the user to program the app to command the base to move the camera to keep track with the anticipated position of a certain performer throughout a performance. For example, if, at Time=1 minute, the performer will be at place X on the stage, the app can be pre-programmed to command the base to point the attached camera to place X at Time=1 minute. If, at Time=2 minutes, the performer will be at place Y on the stage, the app can be programmed to command the base to point the attached camera to place Y at Time=2 minutes.

Use of the Stepper Motor

Application 15398646 stated, in its specification, that a "stepper" motor could potentially be used as the base motor (12). A stepper motor is one potential type of base motor, and the stepper motor has these advantages: It makes unnecessary the LED light (23), position locating hole (25), and light sensor (27), while achieving the base motor's function of moving the stud and attached camera to the desired position. Embodiments of the invention using the stepper motor have also eliminated the need for the disk and gear reduction unit. The gear drive and rotating mechanism will not include a gear reduction unit, in embodiments of the invention that use a stepper motor as the base motor.

A stepper motor can divide a full rotation into a number of discrete steps (such as 360 steps, one for each degree in a circle), and can be commanded to move and hold at one of these steps without the need for feedback from a position sensor.

Versions of the stepper motor can operate with a signal processor called an "encoder". The encoder in the first embodiment discussed here allows the stepper motor to detect when to stop, and then stop. The encoder includes lines, which the encoder uses to determine the position of the stud and any attached camera. The encoder in the first embodiment discussed here includes a line for each "degree", in a circle around the stud, for a total of 360 degrees, for a full circle. The starting position is considered "0" in most embodiments. As the stud (or another component which moves in a way exactly correlated to the movement of the stud) rotates, the encoder counts the number of lines that the rotation has covered, which is the number of degrees that the rotation has covered. When the amount of rotation reaches the number of degrees needed to fulfill the user's command, the encoder will cause the motor to stop.

The encoder in some embodiments can contain the necessary information about the number of degrees of movement, and types of movement, needed to execute each command, meaning that the encoder will include information about how to execute each command, and monitor the position of other components to make sure the command is executed. For example, when the encoder receives information that the user has given a command to "rotate 90 degrees clockwise", the encoder will know that 90 degrees of clockwise movement is required to execute this command, and will monitor the number of lines that the stud (or another component which moves in a way that directly correlates to the movement of the stud) has moved, until 90 degrees of movement are reached.

Alternatively, other components can contain the information about what is required to fulfill each command, and, in the above scenario the motor control board can simply command the encoder to count the number of degrees the stud has moved until the encoder reaches 90 degrees, after which the stepper motor will stop.

In embodiments using the disk, the movement of the disk exactly correlates to movement of the stud. After the motor control board commands the motor to execute the necessary movements to fulfill the user's commands, the encoder monitors the position of the stud, (or in some other embodiments directly monitors another component with movement that exactly correlates to movement of the stud), and counts the number of degrees of movement the stud has made while executing a command (or, again, in other embodiments, counts the number of degrees of movement the other component has made while executing the command). When the stud (or other component) has made the number of degrees of movement needed to execute the user's command, the encoder will cause the motor to stop. For example, if the user gives a command for "right 90 degrees", the encoder will count 90 lines, as the stud (or other component) makes the 90 degrees of rotation, and then the encoder will cause the motor to stop.

Visual Aids on the Base

In some embodiments, the base has a circular chart, on its top, showing indicators for different camera positions and the angles of these positions relative to a "zero" position. For example, the chart can show "15 degrees", "30 degrees", etc. Lines indicating these angles can also be made vertically down the sides of the base.

Information about the Base Program

The base program can be, but does not have to be, programmed through Arduino. Some embodiments of the invention use an antenna capable of receiving Bluetooth transmissions as the "base wireless receiver" (9), and these embodiments generally use Bluetooth to communicate wirelessly between the base wireless transmitter (10), base wireless receiver (9) and the remote control or PC.

Attachment

In addition to the methods of attachment previously discussed, the base may potentially be attached to other objects by one or more magnets on the bottom of the base.

Indicator Light

Most embodiments have an indicator light to indicate when the base is charging and power is being received through the charging port (8).

The discussion included in this patent is intended to serve as a basic description. The reader should be aware that the specific discussion may not explicitly describe all embodiments possible, and alternatives are implicit, or obvious to those skilled in the art. Also, this discussion may not fully explain the generic nature of the invention and may not explicitly show how each feature or element can actually represent equivalent elements. Again, these are implicitly included in this disclosure. Where the invention is described in device-oriented terminology, each element of the device implicitly performs a function. It should also be understood that a variety of changes may be made to the embodiments that have been described, without departing from the essence of the invention. Such changes are implicitly included in the description. These changes still fall within the scope of this invention.

Furthermore, each of the various elements of the invention and claims may also be achieved in a variety of manners. This disclosure should be understood to encompass each such variation, whether it is a variation of an apparatus embodiment, a method embodiment, or a variation in any element of an embodiment. As the disclosure relates to elements of the invention, the words describing each element may be replaced by equivalent apparatus terms, even if only the function or result is the same. Such equivalent, broader, or even more generic terms should be considered to be encompassed in the description of each element or action. Such terms can be substituted, when desired, to make explicit the implicitly broad coverage to which this invention is entitled. It should be understood that all actions may be expressed as a means for taking the action in question, or may be expressed as an element for causing the action in question. Similarly, each physical element disclosed should be understood to encompass a disclosure of the action which that physical element facilitates. Such changes and terms are to be understood to be explicitly included in the description.

DETAILED DESCRIPTION OF THE DRAWINGS

Figure 1:
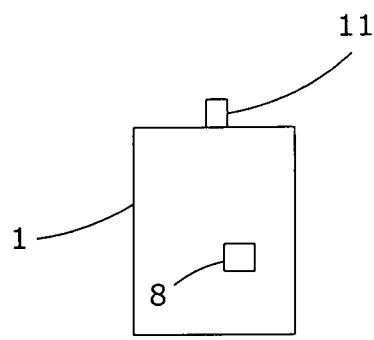
FIG. 1 shows a front view of an embodiment of the base with an exterior screw mount (6).

FIG. 1 shows a front view of an embodiment of the base (1) with an exterior screw mount (6). The stud (11) can be seen on top of the exterior screw mount (6) at the top of the base (1). The base charging port (8) can be seen near the bottom of the base. Some of the other components of the base are inside the base and not visible.

Figure 2:
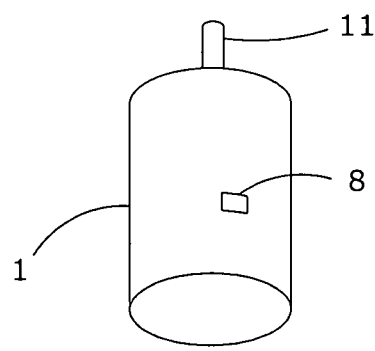
FIG. 2 shows a "bird's-eye view" of one embodiment of the base from below and to the front.

FIG. 2 shows a "bird's-eye view" of the main embodiment of the base (1) from below and to the front. The stud (11) can be seen at the top. The base charging port (8) can be seen on the side.

Figure 3:
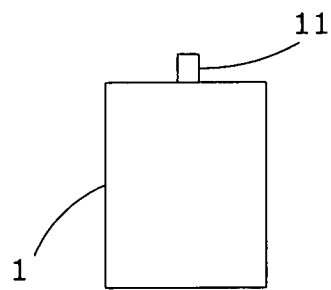
FIG. 3 shows a back view of one embodiment of the base.

FIG. 3 shows a back view of another embodiment of the base (1). The exterior screw mount (6) and stud (11) can be seen at the top of the base. The base charging port can be seen near the bottom of the base. Some of the other components of the base are inside the base and not visible.

Figure 4:
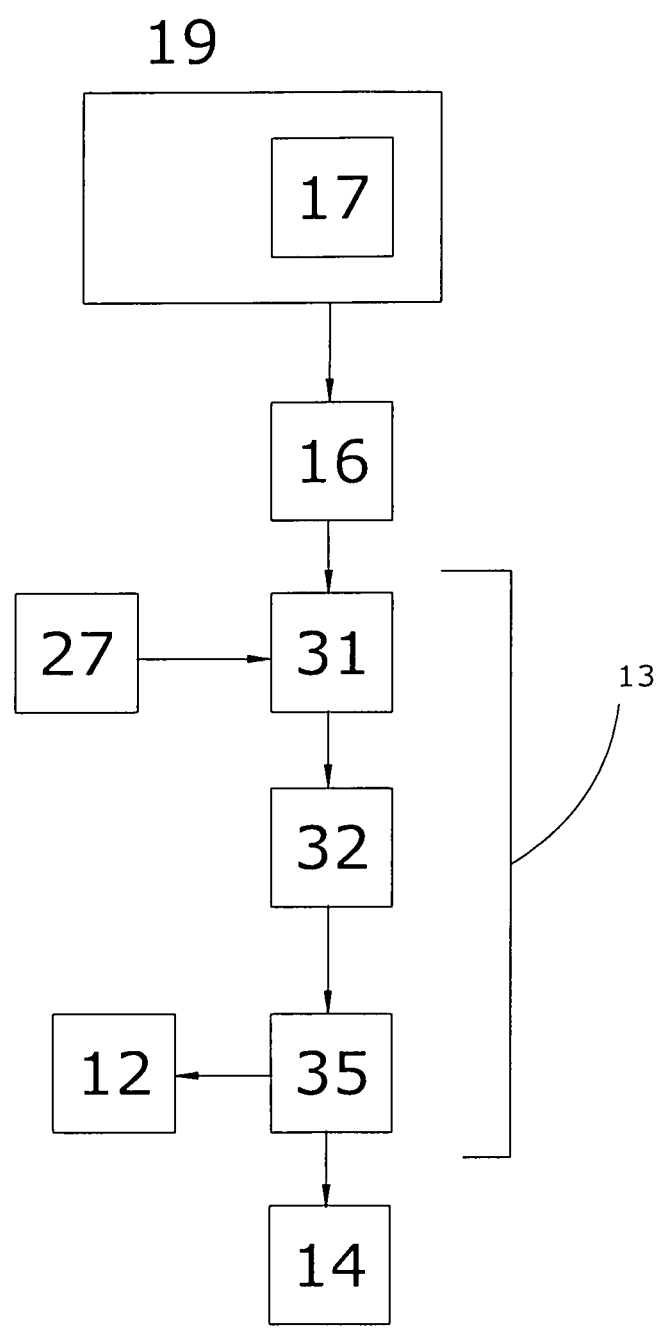
FIG. 4 shows a flow chart of the working of the base program once a command to move the camera is received by the base memory.

FIG. 4 shows a flow chart of the working of the base program once a command to move the camera is received by the base memory, in an embodiment that utilizes light sensors. The pin assignment module (31) includes declarations assigning certain pins to receive inputs from the base receiver and inputs from the light sensors. The pin assignment module (31) then receives inputs from registers that are assigned to receive inputs from the light sensors (directional positioning), and registers that are assigned to receive inputs from the base receiver. The inputs from the light sensors give information about the present position of the stud (and by extension the camera) and the inputs from the base receiver give information about the desired position of the camera, which is governed by the present position of the stud. The pin assignment module (31) sends this information to the pin input deconstruction module (32), which performs calculations on the information using equations that include variables that represent the amount of change in position of the stud that a given application of force from the base motor would create. The pin input deconstruction module (32) includes variables representing characteristics such as the power of the base motor being used, the circumference, and/or diameter, and/or radius of the disk, the weight of components that comprise the rotating mechanism, any necessary allowance for friction, any information that the base program has received about movement the stud is currently making, and the current position of the stud. The results of these calculations, which include the necessary movements of the stud, required to fulfill the commands received from the base receiver, are then sent from the pin input deconstruction module (32) to the commanding module (35). The commanding module includes declarations assigning pins to controlling the motor and to controlling the direction in which the motor and the gear drive are supposed to turn the stud.

Figure 5:
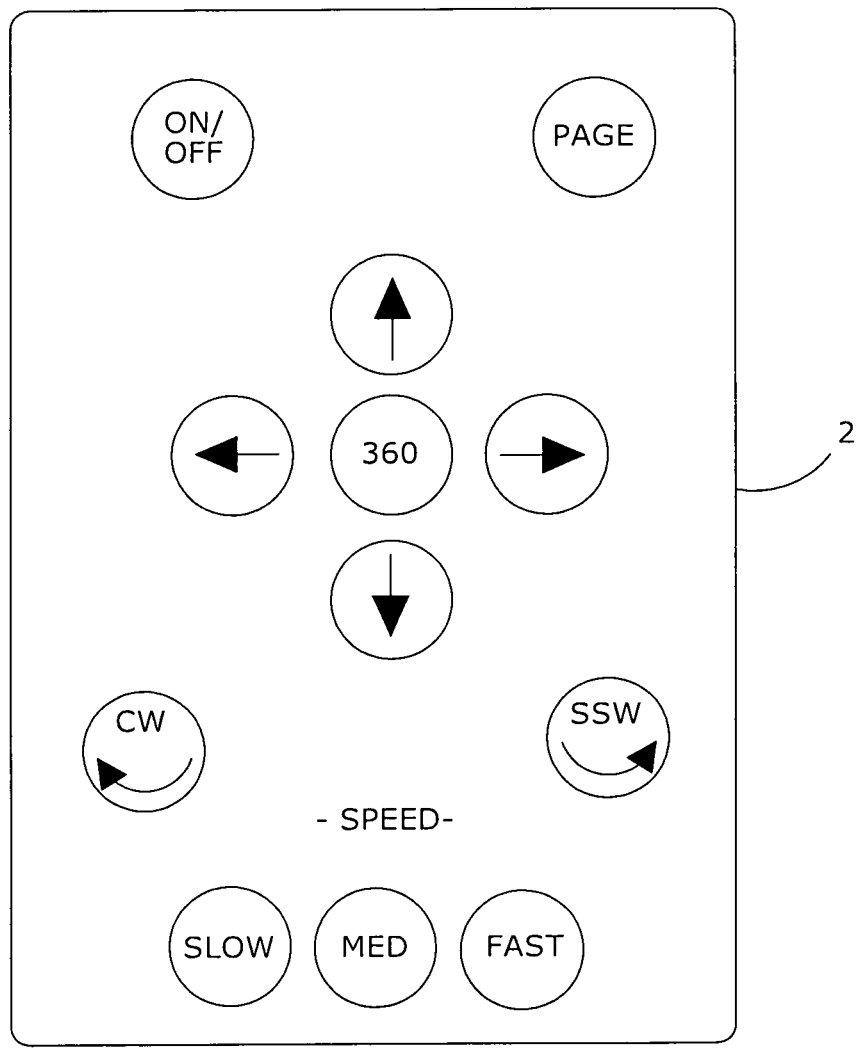
FIG. 5 shows a top view of the remote control of the preferred embodiment.

FIG. 5 shows a top view of the remote control (2) of the preferred embodiment. The buttons that a user can press, to make the screw mount pause, to make the screw mount rotate either clockwise or counter-clockwise, to make the screw mount rotate 360 degrees, or to pick the speed of rotation, as slow, medium, or fast, are shown.

Figure 6:
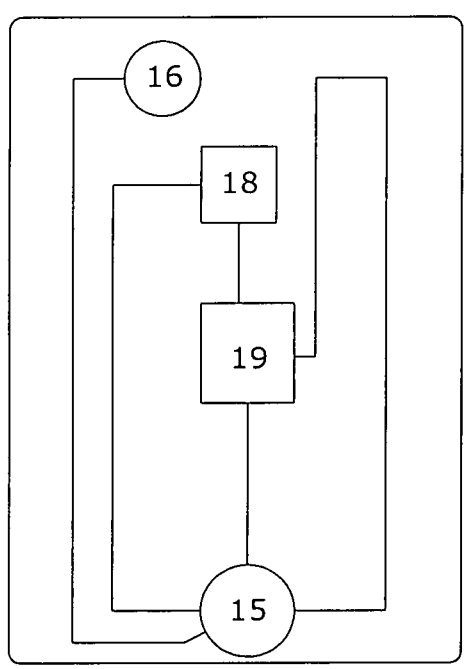
FIG. 6 shows a "cut-away" view of the remote control of the preferred embodiment.

FIG. 6 shows a "cut-away" view of the remote control of the preferred embodiment. The remote battery (15) is shown, and connections between the battery (15) and components (18), (19), and (16) show how the battery powers components (18), (19), and (16). The remote wireless transmitter (16) sends the commands created by the user to the base. The remote wireless receiver (18) receives information from the base about the current position of the stud. The remote decoding board (19) receives the commands that the user creates by pressing the buttons on the remote. The remote program (17), which is stored on the remote decoding board, then translates these commands into impulses that can be understood by the base program (13). The remote decoding board then sends these impulses to the remote wireless transmitter (16), where the impulses are sent to the base wireless receiver (9).

Figure 7:
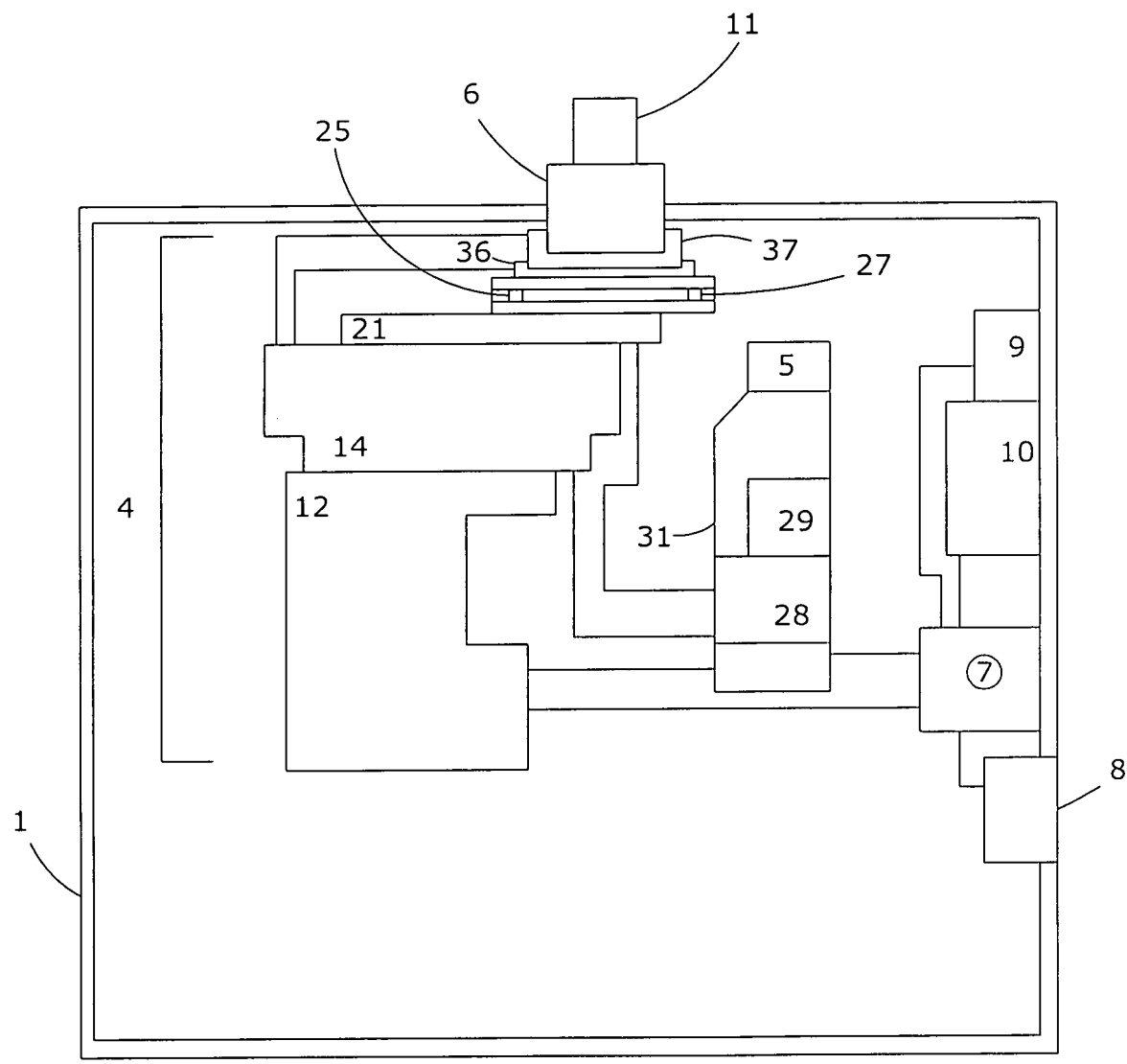
FIG. 7 shows a "cut-away" view of one embodiment of the base.

FIG. 7 shows a "cut-away" view of one embodiment of the base. The base memory (5) and the base wireless receiver are designated. The base memory is connected to the base motor, which powers the gear drive. The gear drive, when it turns, rotates the exterior screw mount. The exterior screw mount then rotates and any camera that is attached to the exterior screw mount will also rotate. The base battery powers the base memory and base battery. The charging port (8) is where a user can place a plug to charge the base battery, or can otherwise charge the base battery. There is a connection between the charging port (8) and the base battery (7) for this purpose. The base battery (7) has connections to the base wireless receiver (9), and base wireless transmitter (10), and to the base processor (34) and the base motor (12), allowing the base battery (7) to power these components. The other components of the rotating mechanism (4) are connected to the base motor (12), and receive power from the base battery via the base motor (12). In this embodiment of the invention, the rotating mechanism includes the base motor (12), the gear drive (14), and a gear reduction unit (21). The rotating mechanism also includes the exterior screw mount (6), the stud (11), and also, among other components, four LED lights (23), a disk (24), four positioning holes (25) in the disk, and four light sensors (27). Only one LED light (23) and one positioning hole (25) can be seen in this figure. The rotating mechanism, in this embodiment, also includes an incliner (37) and an altitude changer (36).

The base motor connects to, and transmits power to, the gear drive (14). The gear drive (14) connects to, and transmits power to, the gear reduction unit (21).

The gear reduction unit connects to, and transmits power to, the LED lights and light sensors. The gear reduction unit also connects to the disk, so that motive power can be transmitted from the base motor, gear drive, and gear reduction unit to the disk. There should also be a connection between the gear reduction unit and the incliner, and a connection between the gear reduction unit and the altitude changer, so that power is transmitted via the gear reduction unit to the incliner and the altitude changer.

The stud generally has an angle of 90 degrees with the bottom of the base. The incliner is positioned so that it can move the exterior screw mount and stud, changing the angle between the stud and the bottom of the base to less than 90 degrees on one side.

The altitude changer helps the exterior screw mount and stud to move up and down, thus changing their "altitude". It is positioned to allow the exterior or interior screw mount, and stud, to move up and down.

The disk, and the position locating hole, can be seen. The disk is designed so that the disk will move, in the same manner as the stud.

The base processor (34) is also connected to, and receives power from, the base battery. The base processor (34) in this embodiment, includes the base memory (5), motor control board (28), and Propan360 decoder (29). The motor control board (28) is connected to the gear drive and the disk and motor and gear reduction.

Figure 8:
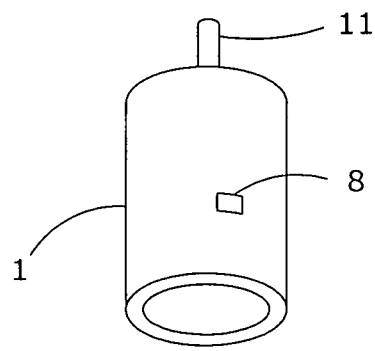
FIG. 8 shows a "bird's-eye view" of one embodiment of the base from below and to the front with adhesive adhered to the bottom of the base.

FIG. 8 shows a "bird's-eye view" of an embodiment of the base from below and to the front with adhesive adhered to the bottom of the base. The viewer can see that this adhesive will help the user to position the base in places such as hanging upside-down from the ceiling, where the base might otherwise be difficult to place. The adhesive also helps to make it easier for the user to place the base in one place, such as near the steering wheel of a recreational vehicle, and to ensure that the base does not get moved away from this place by turbulence.

Figure 9:
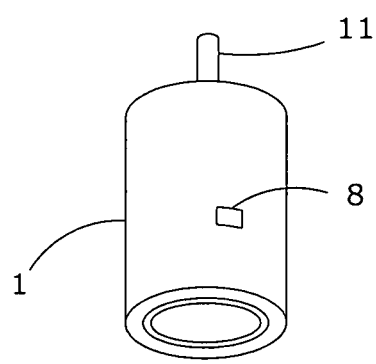
FIG. 9 shows a "bird's-eye view" of one embodiment of the base from below and to the front with a suction cup adhered to the bottom of the base.

FIG. 9 shows a "bird's-eye view" of an embodiment of the base from below and to the front with a suction cup adhered to the bottom of the base. The viewer can see that this suction cup will help the user to position the base in places where the base might otherwise be difficult to place. The suction cup also helps to make it easier for the user to place the base in one place, such as on the deck of a boat, and to ensure that the base does not get moved away from this place by turbulence.

Figure 10:
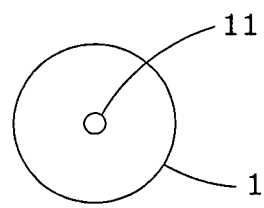
FIG. 10 shows a top view of one embodiment of the base.

FIG. 10 shows a top view of one embodiment of the base. The exterior screw mount and stud (11) can be seen.

Figure 11:
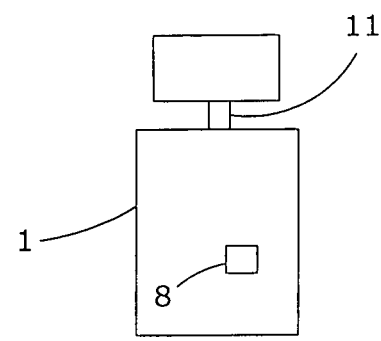
FIG. 11 shows a front view of one embodiment of the base with a camera attached.

FIG. 11 shows a front view of an embodiment of the base with a camera attached. The stud is hidden behind the camera. A charging port (8) can be seen on the front of the embodiment.

Figure 12:
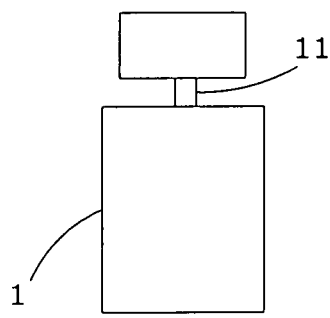
FIG. 12 shows a back view of one embodiment of the base with a camera attached.

FIG. 12 shows a back view of an embodiment of the base with a camera attached. Here, the screw mount is visible. The stud is attached to it, and the way in which the stud attaches to the camera can be seen.

Figure 13:
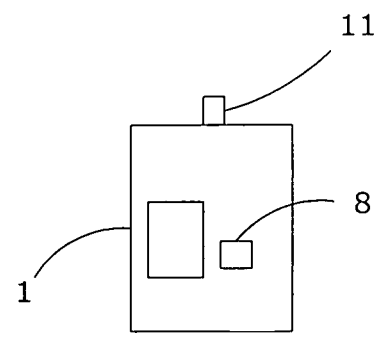
FIG. 13 shows a front view of the base and remote with solar cells attached.

FIG. 13 shows a front view of one embodiment of the base and remote with solar cells attached.

Figure 14:
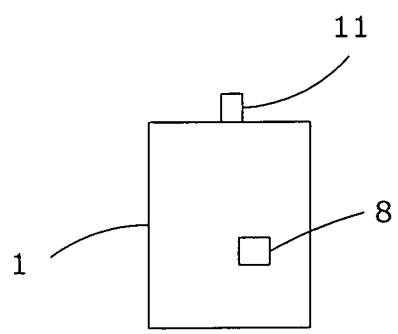
FIG. 14 shows a front view of an embodiment of the base with an interior screw mount.

FIG. 14 shows a front view of an embodiment of the base with an interior screw mount. A charging port (8) can be seen on the front of the embodiment.

Figure 15:
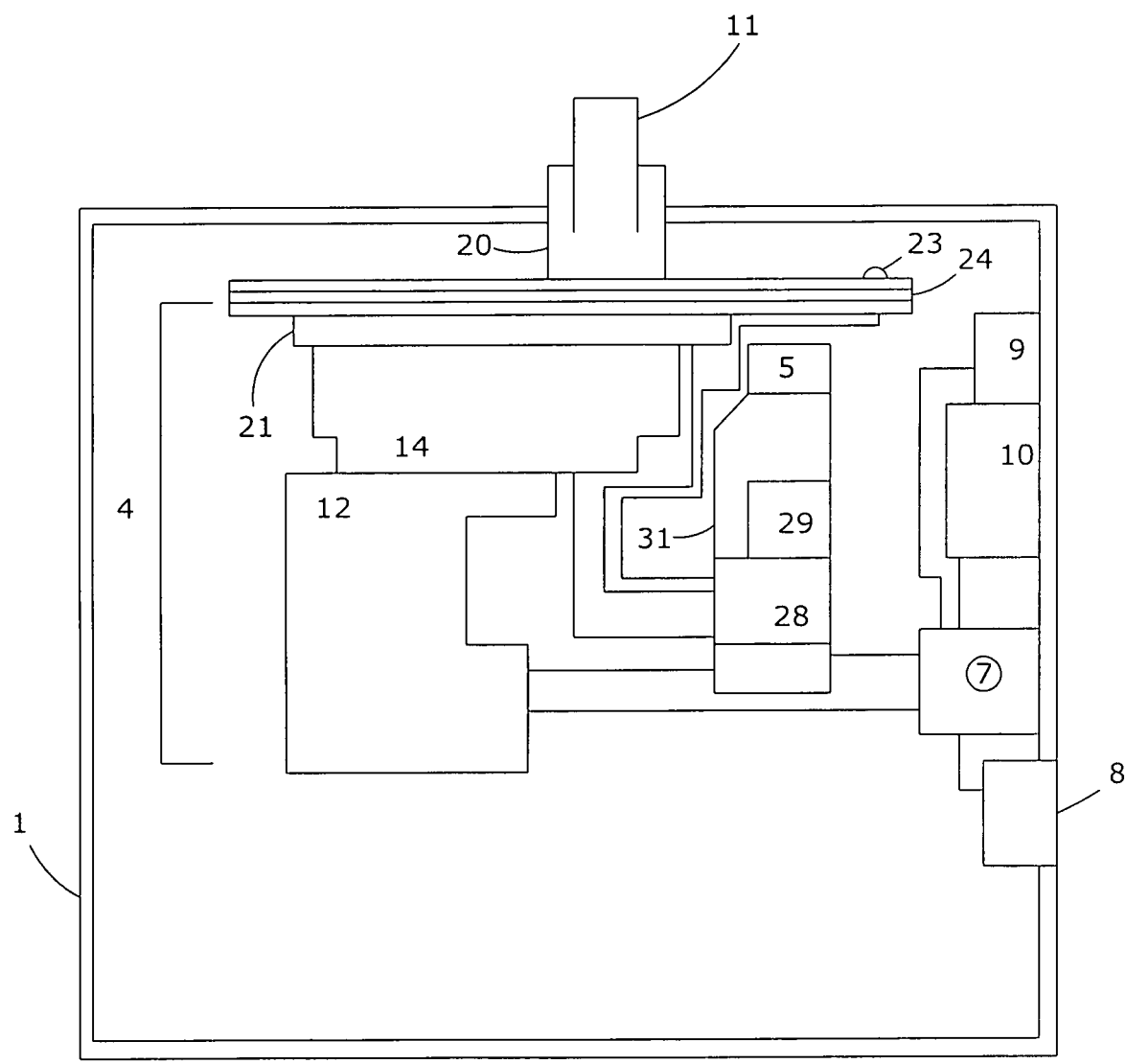
FIG. 15 shows a "cut-away" view of an embodiment of the base with an interior screw mount.

FIG. 15 shows a "cut-away" view of an embodiment of the base with an interior screw Mount (20). Here, the interior screw mount does not protrude above the surface of the base.

Figure 16:
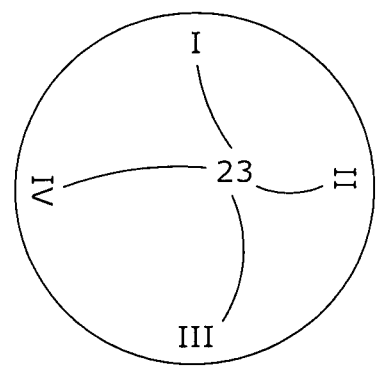
FIG. 16 shows a view of all of the LED lights (23) in one embodiment, showing the position of these LED lights relative to each other.

FIG. 16 shows a view of all of the LED lights (23) in one embodiment, showing the position of these LED lights relative to each other. There is an angle of 90 degrees between them. The LED lights can have a form similar to, or different from, the form they have in this illustration.

Figure 17:
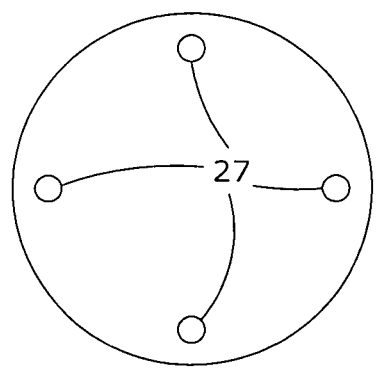
FIG. 17 shows a view of all of the position sensors (27) in one embodiment, showing the position of these position sensors relative to each other.

FIG. 17 shows a view of all of the light sensors (27) in one embodiment, showing the position of these light sensors relative to each other. There is an angle of 90 degrees between them. The light sensors can have a form similar to, or different from, the form they have in this illustration.

The invention claimed is:

1. An apparatus for holding a camera to allow said camera to perform filming, said apparatus further comprising;
    a base and a means for wirelessly commanding said base;
    said base further comprising a base wireless receiver (9) and a base memory (5) and a rotating mechanism and a screw mount and a base battery (7) and a base motor (12), where said base motor is a stepper motor,
    said base further comprising a base program (13) and a gear drive (14) and a means of camera attachment;
    and said base further comprising that said base motor (12), said gear drive (14) and said screw mount are parts of said rotating mechanism;
    said base battery (7) being operatively connected to, and providing power for, said base wireless receiver (9) and said base memory (5) and said base motor (12);
    said base wireless receiver (9) being capable of receiving wireless signals from said means for wirelessly commanding said base; and said base wireless receiver (9) being operatively connected to said base memory (5) so as to be able to transmit said signals to said base memory (5);
    and said base memory (5) being specially programmed with said base program (13) to have the capacity to interpret such signals from said means for wirelessly commanding said base;
    and to command said base motor (12) to perform an action based on a signal received by said base memory (5) from said base wireless receiver (9);
    and said base memory being operatively connected to said base motor (12) so that said base motor (12) can receive commands from said base memory, and said base motor (12) can turn said gear drive (14) in response to commands from said base memory (5);
    and said gear drive (14) being connected to said screw mount so that, when said gear drive (14) is turned by said base motor (12), said gear drive will turn said screw mount and cause said screw mount to rotate;
    and said screw mount being able to rotate;
    and a means for attachment being attached to said screw mount;
    said means for attachment being capable of holding a camera affixed to said means for attachment;
    so that if a camera is affixed to said means for attachment, and said screw mount rotates, means for attachment, and said camera will be caused to rotate in a predictable manner by said screw mount.

2. The apparatus of claim 1, further comprising that the base includes a charging port (8) which is operatively connected to said base battery in a way which permits said charging port (8) to electrically charge said base battery when said charging port (8) is receiving power from a power source;
    said apparatus further comprising that said charging port is capable of wirelessly receiving electrical power via inductive charging, and using this electrical power to charge said base battery.

3. The apparatus of claim 1, further comprising a means for adhering, which is a magnet affixed to the bottom of said base, where said magnet has sufficient magnetic strength to adhere said base upside-down to a specific location to which said magnet is magnetically attracted.

4. The apparatus of claim 1, further comprising a means for adhering, affixed to the bottom of said base, where said means for adhering has sufficient strength to adhere said base upside-down to a specific location, and where said means for adhering is double-tape.

5. The apparatus of claim 1, further comprising that said means for wirelessly commanding said base is a remote control, which is capable of wirelessly sending signals to said base wireless receiver (9);
    said apparatus further comprising one or more of the following;
    a) that said base (1) includes a solar cell, which is operatively connected to said base battery so that said solar cell can recharge said base battery;
    b) that said remote control includes both a remote battery, where said remote battery is capable of providing electrical power for some or all of the components of said remote control, and a solar cell, where said solar cell is operatively connected to said remote battery so that said solar cell can recharge said remote battery.

6. The apparatus of claim 1, further comprising that said means for wirelessly commanding said base is a remote control, which is capable of wirelessly sending signals to said base wireless receiver (9);
    said apparatus further comprising that said remote control includes a remote battery (15), said apparatus further comprising that said remote control includes the capability to receive electrical power via inductive charging, and for said electrical power to be routed to said remote battery, which will be recharged via receiving said electrical power.

7. The apparatus of claim 1, further comprising that said means for wirelessly commanding said base is a remote control, which is capable of wirelessly sending signals to said base wireless receiver (9);
    said apparatus further comprising that said remote control is covered by a membrane cover, thus making said remote control water resistant.

8. The apparatus of claim 1, further comprising that said base is waterproof.

9. The apparatus of claim 1, further comprising that said means for wirelessly commanding said base is a remote control, which is capable of wirelessly sending signals to said base wireless receiver (9);
    and further comprising that said remote control is powered by a remote battery (15), and further comprising that either said base battery, or said remote battery, or both said base battery and said remote battery, will be lithium iron batteries.

10. The apparatus of claim 1, further comprising that said means for wirelessly commanding said base is a computer program, which is capable of being operated on a PC, and is capable of wirelessly sending signals to said base wireless receiver (9).

11. The apparatus of claim 1, further comprising that said means for attachment is a stud, and further comprising an altitude changer (36) which is connected to said stud, and is part of said base, and where said altitude changer is operatively connected to said gear drive, allowing said gear drive to cause said altitude changer, to move vertically up and down, and to cause any stud attached to said altitude changer to also move vertically up and down together with said altitude changer.

12. The apparatus of claim 1, further comprising that said means for attachment is a stud, and further comprising an incliner (37) which is connected to said stud, and is part of said base, and where said incliner is operatively connected to said gear drive, allowing said gear drive to cause said incliner to cause the angle between said stud and the bottom of said base to change, therefore changing the angle relative to the bottom of said base, at which any camera attached to said stud is pointed.

13. A method of filming video footage; utilizing a camera and a base and a means for wirelessly commanding said base;

said base further comprising a base wireless receiver (9) and a base memory (5) and a rotating mechanism, and a screw mount and a base battery (7) and a base motor (12) which is a stepper motor, and a base program (13) and a gear drive (14) and a means of camera attachment;

and further comprising that said base motor (12), gear drive (14) and screw mount are parts of said rotating mechanism;

said base battery (7) being operatively connected to, and providing power for, said base wireless receiver (9) and said base memory (5) and said base motor (12);

said base wireless receiver (9) being capable of receiving wireless signals from said means for wirelessly commanding said base; and said base wireless receiver (9) being operatively connected to said base memory (5) so as to be able to transmit said signals to said base memory (5);

and said base memory (5) being specially programmed with said base program (13) to have the capacity to interpret such signals from said means for wirelessly commanding said base;

and to command said base motor (12) to perform an action based on a signal received by said base memory (5) from said base wireless receiver (9);

and said base memory being operatively connected to said base motor (12) so that said base motor (12) can receive commands from said base memory, and said base motor (12) can turn said gear drive (14) in response to commands from said base memory (5);

and said gear drive (14) being connected to said screw mount so that, when said gear drive (14) is turned by said base motor (12), said gear drive will turn said screw mount and cause said screw mount to rotate;

and a means for attachment being attached to said screw mount;

said means for attachment being capable of holding a camera affixed to said means for attachment;

and said means of attachment being capable of rotating 360 degrees;

and said method comprising the steps of;

attaching a camera with video capability to said means of attachment;

activating said camera;

using said means for wirelessly commanding said base to cause said camera to film the desired video footage by using the means for wirelessly commanding said base to command said base memory to command said base motor to rotate said gear mechanism, causing said gear mechanism to rotate said screw mount, thus causing said means for attachment to rotate, therefore causing said camera to rotate in the necessary directions to capture the desired video footage.

14. The method of claim 13, further comprising that as said screw mount rotates said means of attachment and said camera, said camera captures a single, unified video recording of one or more events that take place in multiple locations, so that said single, unified video recording of the one or more events can be displayed later, without the need to edit together multiple video recordings of different part(s) of the event(s) that happen in different locations.

15. The method of claim 13, further comprising that said base is located upon a moving object; while said camera is rotating and capturing the desired video footage.

16. The method of claim 13, further comprising that said base includes a means for adhering.

17. The method of claim 13, further comprising that the means for wirelessly commanding said base is a computer program, which has the capacity to run on a PC and use the PC's wireless transmission capabilities to send commands from the user to the base wireless receiver (9).

18. A system for holding and rotating a camera so that the camera can create footage, said system comprising a base (1), and a means for wirelessly commanding said base;

said base further comprising a base wireless receiver (9) and a base memory (5) and a rotating mechanism and a screw mount and a base battery (7)

and a base motor (12) which is a stepper motor, and a base program (13) and a gear drive (14) and a means of camera attachment;

and said base further comprising that said base motor (12), gear drive (14) and screw mount are parts of said rotating mechanism;

said base battery (7) being operatively connected to, and providing power for, said base wireless receiver (9) and said base memory (5) and said base motor (12);

said base wireless receiver (9) being capable of receiving wireless signals from said means for wirelessly commanding said base; and said base wireless receiver (9) being operatively connected to said base memory (5) so as to be able to transmit said signals to said base memory (5);

and said base memory (5) being specially programmed with said base program (13) to have the capacity to interpret such signals from said remote control;

and to command said base motor (12) to perform an action based on a signal received by said base memory (5) from said base wireless receiver (9);

and said base memory being operatively connected to said base motor (12) so that said base motor (12) can receive commands from said base memory, and said base motor (12) can turn said gear drive (14) in response to commands from said base memory (5);

and said gear drive (14) being connected to said screw mount so that, when said gear drive (14) is turned by said base motor (12), said gear drive will turn said screw mount and cause said screw mount to rotate;

and said screw mount being able to rotate;

and a means for attachment being attached to said screw mount;

said means for attachment being capable of holding a camera affixed to said means for attachment;

and said means for wirelessly commanding said base further comprising
a means of powering said remote control;
and a remote wireless transmitter (16);
said means of powering said remote control providing power to said remote transmitter;
said remote control being capable of receiving inputs from the user;
where said inputs from the user can be transmitted from said remote wireless transmitter (16) to said base receiver (9).

19. The system of claim 18, further comprising one or more bases, where either each said base is in communication with a separate means for commanding that base;
or all said bases are in communication with the same means for commanding the bases;
wherein the stud of each base is attached to a separate camera that creates video footage for security purposes.

20. The system of claim 18, further comprising that said base wireless receiver (9) and said means for commanding said base communicate via Bluetooth.

\* \* \* \* \*